(12) United States Patent
Stoufer et al.

(10) Patent No.: US 10,353,558 B2
(45) Date of Patent: Jul. 16, 2019

(54) DRAG-AND-SET USER INTERFACE FOR APPLIANCES

(71) Applicant: ELECTROLUX HOME PRODUCTS, INC., Charlotte, NC (US)

(72) Inventors: Paul Stoufer, Lincolnton, NC (US); Thomas Josefsson, Concord, NC (US); James Fisher, Charlotte, NC (US)

(73) Assignee: ELECTROLUX HOME PRODUCTS, INC., Charlotte, NC (US)

( * ) Notice: Subject to any disclaimer, the term of this patent is extended or adjusted under 35 U.S.C. 154(b) by 183 days.

(21) Appl. No.: 14/994,825

(22) Filed: Jan. 13, 2016

(65) Prior Publication Data

US 2017/0199658 A1    Jul. 13, 2017

(51) Int. Cl.
| | |
|---|---|
| *G06F 3/0482* | (2013.01) |
| *G06F 3/0484* | (2013.01) |
| *G06F 3/0486* | (2013.01) |
| *G06F 13/00* | (2006.01) |
| *G06F 15/00* | (2006.01) |
| *F24C 7/08* | (2006.01) |
| *G06F 3/0488* | (2013.01) |

(52) U.S. Cl.
CPC .......... *G06F 3/04847* (2013.01); *F24C 7/082* (2013.01); *F24C 7/086* (2013.01); *G06F 3/0482* (2013.01); *G06F 3/0486* (2013.01); *G06F 3/04842* (2013.01); *G06F 3/04883* (2013.01)

(58) Field of Classification Search
CPC ...................................................... F24C 7/082
USPC ......................... 715/763–765, 780, 740, 784
See application file for complete search history.

(56) References Cited

U.S. PATENT DOCUMENTS

| | | | |
|---|---|---|---|
| 7,436,317 B2 | 10/2008 | Becke et al. | |
| 8,296,889 B2 | 10/2012 | Motamedi | |
| 8,555,776 B2 | 10/2013 | Murphy et al. | |
| 8,674,270 B2 | 3/2014 | Anderson et al. | |
| 8,713,975 B2 | 5/2014 | Motamedi et al. | |
| 8,733,132 B2 | 5/2014 | Motamedi | |
| 8,868,248 B2 | 10/2014 | Park | |
| 2007/0158335 A1* | 7/2007 | Mansbery | F24C 7/082 219/505 |
| 2009/0153288 A1 | 6/2009 | Hope et al. | |

(Continued)

FOREIGN PATENT DOCUMENTS

DE    1020008032449    1/2010

OTHER PUBLICATIONS

International Search Report dated Mar. 24, 2017 in International Patent Application No. PCT/IB2017/050201 filed Jan. 13, 2017.

*Primary Examiner* — Cao H Nguyen
(74) *Attorney, Agent, or Firm* — Womble Bond Dickinson (US) LLP

(57) ABSTRACT

An appliance is provided that includes a control unit, a plurality of components, and a touchscreen in which the plurality of components and touchscreen are configured to operate under control of the control unit. A graphical user interface (GUI) may be generated for display by the touchscreen. The GUI may include graphical control elements for respective components of the plurality of components. For each graphical control element of the graphical control elements, a touch gesture to drag the graphical control element may be detected for a component of the respective components. In response, a mode or setting of a plurality of modes or settings of the component may be adjusted.

18 Claims, 14 Drawing Sheets

(56) References Cited

U.S. PATENT DOCUMENTS

| | | |
|---|---|---|
| 2011/0062143 A1 | 3/2011 | Satanek |
| 2011/0087987 A1 | 4/2011 | Brown |
| 2012/0217254 A1* | 8/2012 | Cho ................. F25D 29/00 220/592.02 |
| 2012/0260683 A1 | 10/2012 | Cheon et al. |
| 2012/0296488 A1 | 11/2012 | Dharwada et al. |
| 2013/0054863 A1 | 2/2013 | Imes et al. |
| 2013/0062968 A1 | 3/2013 | Lovisotto et al. |
| 2013/0067375 A1 | 3/2013 | Kim et al. |
| 2013/0092145 A1 | 4/2013 | Murphy et al. |
| 2013/0092682 A1 | 4/2013 | Mills et al. |
| 2013/0200729 A1 | 8/2013 | Lovisotto et al. |
| 2013/0204406 A1 | 8/2013 | Andersson et al. |
| 2013/0290902 A1 | 10/2013 | Martin et al. |
| 2014/0101589 A1 | 4/2014 | Hyun et al. |
| 2014/0184046 A1 | 7/2014 | Park et al. |
| 2015/0153050 A1 | 6/2015 | Eriksson et al. |

\* cited by examiner

DRAG-AND-SET USER INTERFACE FOR APPLIANCES

TECHNOLOGICAL FIELD

The present disclosure relates generally to appliances and, in particular, to a user interface configured to effect control of an appliance via drag-and-set touch gestures.

BACKGROUND

Certain appliances may include a controller or other control unit in electrical communication with one or more user interfaces or other control elements. Various operational components of the appliance are thus controlled via the control unit in response to various commands or user selections for controlling such components initiated through the user interface/control elements.

In some instances, the user interface may include various mechanically-actuatable user interface elements for permitting user selection from among a plurality of settings of an appliance or components thereof. For example, a rotatable knob and/or physical button may be provided for altering one or more settings. Mechanically-actuatable user interface elements, however, may only provide limited usability and user-friendliness for the user. Moreover, many modern appliances include integrated displays that are used for display and selection of control functions and status information. However, the displays often include complex functionality. Accordingly, current user interfaces for appliances do not provide for simplistic and more intuitive control of an appliance's functionality such as by requiring only a single touch of a touchscreen.

Therefore, it may be desirable to have an appliance and method that take into account at least some of the issues discussed above, as well as possibly other issues.

BRIEF SUMMARY

Example implementations of the present disclosure provide an improved appliance and method for controlling an appliance with improved usability and user-friendliness, and which may implement intuitive control configurations. The present disclosure includes, without limitation, the following example implementations:

EXAMPLE IMPLEMENTATION 1

An appliance comprising a control unit. The appliance also comprising a plurality of components and a touchscreen configured to operate under control of the control unit. The control unit is configured to generate a graphical user interface (GUI) for display by the touchscreen. The GUI includes graphical control elements for respective components of the plurality of components. The touchscreen is configured to detect a touch gesture to drag a graphical control element of the graphical control elements in which the graphical control element is for a component of the respective components. The control unit is also configured to adjust a mode or setting of the component in response to the touch gesture. The mode or setting is selectable from a plurality of modes or settings of the component based on a direction in which the graphical control element is dragged. For at least two of the graphical control elements for at least two components of the respective components, the same direction is used for selection of different modes or settings of the at least two components.

EXAMPLE IMPLEMENTATION 2

The appliance of the preceding or subsequent example implementation, or combinations thereof, wherein the touch gesture initially includes a selection of the graphical control element, and in response, the control unit is configured to remove one or more other graphical control elements from the GUI, or alter a color or size of the graphical control element in the GUI, to confirm the selection.

EXAMPLE IMPLEMENTATION 3

The appliance of any preceding or subsequent example implementation, or combinations thereof, wherein the touch gesture initially includes a selection of the graphical control element, and in response, the control unit is configured to activate the component.

EXAMPLE IMPLEMENTATION 4

The appliance of any preceding or subsequent example implementation, or combinations thereof, wherein the control unit is configured to add to the GUI, a plurality of additional graphical control elements for a respective plurality of functions of the component.

EXAMPLE IMPLEMENTATION 5

The appliance of any preceding or subsequent example implementation, or combinations thereof, wherein the touchscreen being configured to detect the touch gesture includes being configured to detect another touch gesture to select an additional graphical control element of the plurality of additional graphical control elements and thereby select a function of the respective plurality of functions, and in response, the control unit is configured to include in the GUI, only the additional graphical control element for the function so selected.

EXAMPLE IMPLEMENTATION 6

The appliance of any preceding or subsequent example implementation, or combinations thereof, wherein the control unit being configured to adjust the mode or setting further includes the control unit being configured to include in the GUI, indicia that corresponds to adjustment of the mode or setting.

EXAMPLE IMPLEMENTATION 7

The appliance of any preceding or subsequent example implementation, or combinations thereof, wherein the component is a timer, and the control unit being configured to adjust the mode or setting includes control unit being configured to add a readout of the timer to the GUI, the readout being partially transparent and superimposed over one or more of the graphical control elements.

EXAMPLE IMPLEMENTATION 8

The appliance of any preceding or subsequent example implementation, or combinations thereof, wherein the control unit being configured to adjust the mode or setting includes being configured to selectively increase or decrease a power level of the component when the graphical control element is dragged in respectively a first direction or an opposing, second direction.

EXAMPLE IMPLEMENTATION 9

The appliance of any preceding or subsequent example implementation, or combinations thereof, the appliance further comprises a proximity sensor configured to detect a presence of a nearby user, and in response, the control unit is configured to activate the touchscreen to display the GUI.

EXAMPLE IMPLEMENTATION 10

A method for controlling an appliance, such a method comprising, at the appliance, generating a graphical user interface (GUI) for display by a touchscreen, the GUI including graphical control elements for respective components of a plurality of components of the appliance; detecting by the touchscreen, a touch gesture to drag a graphical control element of the graphical control elements, the graphical control element being for a component of the respective components; and adjusting a mode or setting of the component in response to the touch gesture, wherein the mode or setting is selectable from a of a plurality of modes or settings of the component based on a direction in which the graphical control element is dragged, and for at least two of the graphical control elements for at least two components of the respective components, the same direction is used for selection of different modes or settings of the at least two components.

EXAMPLE IMPLEMENTATION 11

The method of the preceding or subsequent example implementation, or combinations thereof, wherein the touch gesture initially includes a selection of the graphical control element, and the method further comprises in response thereto, removing one or more other graphical control elements from the GUI, or altering a color or size of the graphical control element in the GUI, to confirm the selection.

EXAMPLE IMPLEMENTATION 12

The method of any preceding or subsequent example implementation, or combinations thereof, wherein the touch gesture initially includes a selection of the graphical control element, and the method further comprises in response thereto, activating the component.

EXAMPLE IMPLEMENTATION 13

The method of any preceding or subsequent example implementation, or combinations thereof, wherein the touch gesture initially includes a selection of the graphical control element, and the method further comprises in response thereto, adding to the GUI, a plurality of additional graphical control elements for a respective plurality of functions of the component.

EXAMPLE IMPLEMENTATION 14

The method of any preceding or subsequent example implementation, or combinations thereof, wherein detecting the touch gesture includes detecting another touch gesture to select an additional graphical control element of the plurality of additional graphical control elements and thereby select a function of the respective plurality of functions, and the method further comprises in response thereto, including in the GUI, only the function so selected.

EXAMPLE IMPLEMENTATION 15

The method of any preceding or subsequent example implementation, or combinations thereof, wherein adjusting the mode or setting further includes including in the GUI, indicia that corresponds to adjustment of the mode or setting.

EXAMPLE IMPLEMENTATION 16

The method of any preceding or subsequent example implementation, or combinations thereof, wherein the component is a timer, and adjusting the mode or setting includes adding a readout of the timer to the GUI, the readout being partially transparent and superimposed over one or more of the graphical control elements.

EXAMPLE IMPLEMENTATION 17

The method of any preceding or subsequent example implementation, or combinations thereof, wherein adjusting the mode or setting includes being configured to selectively increase or decrease a power level of the component when the graphical control element is dragged in respectively a first direction or an opposing, second direction.

EXAMPLE IMPLEMENTATION 18

The method of any preceding or subsequent example implementation, or combinations thereof, further comprising detecting by a proximity sensor, a presence of a nearby user, and in response, activating the display to present the GUI.

These and other features, aspects, and advantages of the present disclosure will be apparent from a reading of the following detailed description together with the accompanying drawings, which are briefly described below. The present disclosure includes any combination of two, three, four, or more features or elements set forth in this disclosure, regardless of whether such features or elements are expressly combined or otherwise recited in a specific implementation description herein. This disclosure is intended to be read holistically such that any separable features or elements of the disclosure, in any of its aspects and implementations, should be viewed as intended, namely to be combinable, unless the context of the disclosure clearly dictates otherwise.

It will therefore be appreciated that the above Summary is provided merely for purposes of summarizing some example implementations so as to provide a basic understanding of some aspects of the disclosure. As such, it will be appreciated that the above described example implementations are merely examples of some implementations and should not be construed to narrow the scope or spirit of the disclosure in any way. It will be appreciated that the scope of the disclosure encompasses many potential implementations, some of which will be further described below, in addition to those here summarized. Further, other aspects and advantages of implementations disclosed herein will become apparent from the following detailed description taken in conjunction with the accompanying drawings which illustrate, by way of example, the principles of the described implementations.

BRIEF DESCRIPTION OF THE DRAWING(S)

Having thus described example implementations of the disclosure in general terms, reference will now be made to the accompanying drawings, which are not necessarily drawn to scale, and wherein:

DETAILED DESCRIPTION

Figure 1:
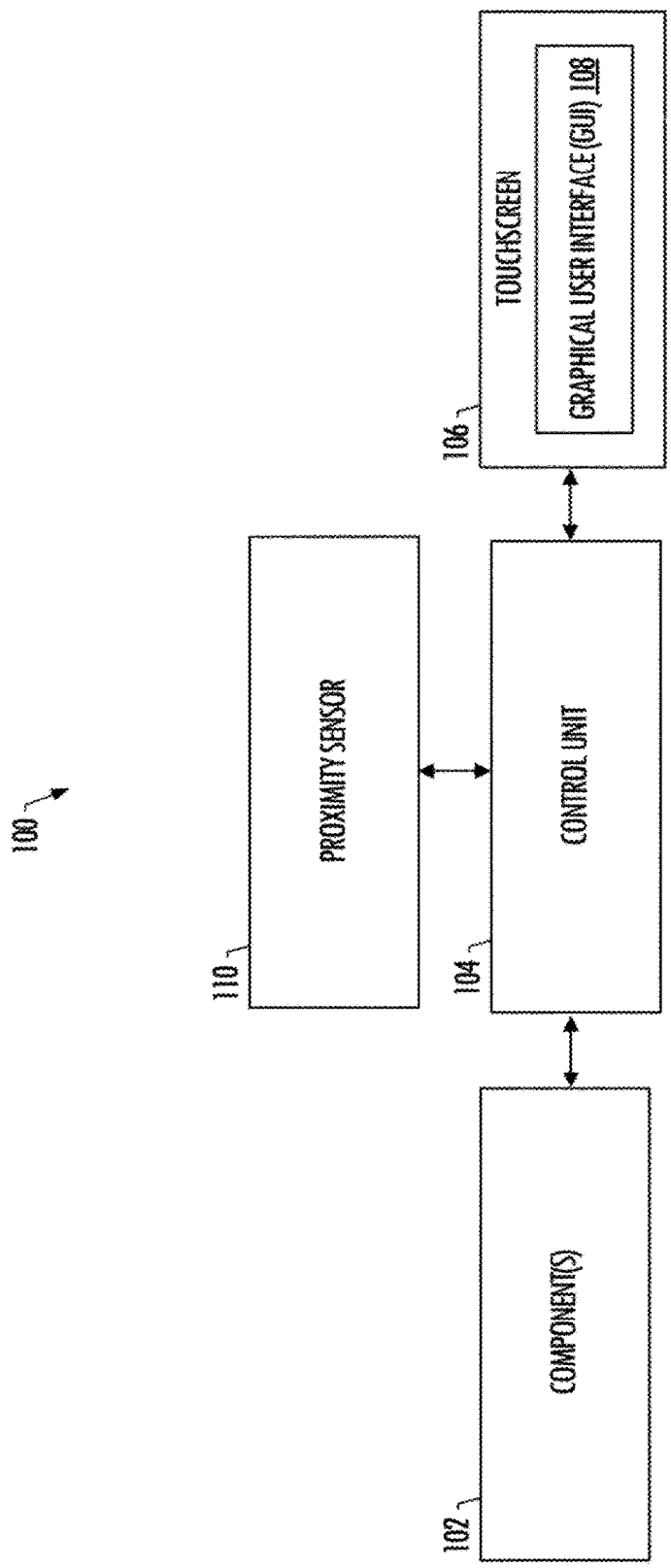
FIG. 1 is an illustration of an appliance according to example implementations of the present disclosure.

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference something as being a first, second or the like should not be construed to imply a particular order. Like reference numerals refer to like elements throughout.

FIG. 1 illustrates an appliance 100 according to example implementations of the present disclosure. The appliance may be any of a number of different types of appliances, such as any of a number of different types of major appliances (white goods), small appliances and the like. Examples of suitable appliances include dishwashers, washing machines, clothes dryers, refrigerators, freezers, ovens, ranges, cooktops, microwave ovens, trash compactors, air conditioners, vacuum cleaners, water heaters or the like.

As shown, the appliance 100 may include a plurality of components 102, which may be generally configured to perform cleaning, cooking, information display, or environmental control operations. The type and number of the components of the appliance may depend on the particular appliance, but may include pumps, valves, motors, heating elements and the like. For example, the components of a kitchen oven, range or food warmer may include one or more heating elements for heating a chamber of the appliance that may be accessible by a door, and one or more temperature sensors for measuring the temperature within the chamber. As another example, a laundry appliance (e.g., a washing or drying machine) may include a tub portion, supported within a housing, in which laundry may be placed for washing and/or drying. A washing or drying drum may be rotatably disposed within the tub portion of the respective washing and drying appliance for agitating or spinning the laundry during the washing or drying process. In another example, an environmental-control appliance such as a refrigerator, freezer, or air conditioner may include components configured to regulate temperature within a compartment of the appliance or another defined space within which the appliance is installed (e.g., one or more rooms of a building).

According to example implementations, at least some components 102 of the appliance 100 may be configured to operate under control of a control unit 104. The appliance may also include a touchscreen 106 configured to operate under control of the control unit. The control unit may include a processor connected to a memory. The processor may generally be any piece of computer hardware that is capable of processing information such as, for example, data, computer-readable program code, instructions or the like (at times generally referred to as "computer programs," e.g., software, firmware, etc.), and/or other suitable electronic information which may be stored in memory. The processor may be composed of a collection of electronic circuits some of which may be packaged as an integrated circuit or multiple interconnected integrated circuits (an integrated circuit at times more commonly referred to as a "chip"). The processor may be configured to execute computer programs, which may be stored onboard the processor or otherwise stored in the memory.

The processor of the control unit 104 may be a number of processors, a multi-processor core or some other type of processor, depending on the particular implementation. Further, the processor may be implemented using a number of heterogeneous processor systems in which a main processor is present with one or more secondary processors on a single chip. The processor may be a symmetric multi-processor system containing multiple processors of the same type. In yet another example, the processor may be embodied as or otherwise include one or more application-specific integrated circuits (ASICs), field-programmable gate arrays (FPGAs) or the like. Thus, although the processor may be capable of executing a computer program to perform one or more functions, the processor of various examples may be capable of performing one or more functions without the aid of a computer program.

The memory of the control unit 104 may generally be any piece of computer hardware that is capable of storing information such as, for example, data, computer programs (e.g., computer-readable program code) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

The appliance 100 may include a number of other components such as a proximity sensor 110 configured to detect a presence of a nearby user (nearby the proximity sensor, and accordingly, the appliance).

The appliance 100 may also include one or more interfaces for displaying, transmitting and/or receiving information, which may be coupled to and operate under control of the control unit 104. The interfaces may include a communication interface and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interface may include a display and/or one or more user input interfaces. The display may be configured to present or otherwise display information to a user, suitable examples of which include a liquid crystal display (LCD), light-emitting diode display (LED), plasma display panel (PDP) or the like. The user input interface(s) may be wired or wireless, and may be configured to receive information from a user into the appliance 100, such as for processing, storage and/or display. Examples of suitable user input interfaces include a microphone, image or video capture device, keyboard or keypad, joystick, touch-sensitive surface, biometric sensor or the like. The user interfaces may further include one or more interfaces for communicating with peripherals such as printers, scanners or the like. As shown, in some examples, the user interface may include the touchscreen 106 with an integrated display and touch-sensitive surface. The touchscreen may be configured to operate under the control unit 104 to present or otherwise display information to a user via a graphical user interface (GUI) 108.

According to example implementations, the control unit 104 may generally be configured to generate the GUI 108 for display by the touchscreen 106 in which the GUI may include graphical control elements for respective components 102 of the appliance 100. The respective components may vary based on the appliance type. Examples of suitable components include cooktop burners, cooking chambers such as within conventional ovens and microwave ovens, cleaning chambers such as within dishwashers and clothes washers, clocks, timers and the like. As described in greater detail below, the touchscreen may generally be configure to detect a touch gesture to drag a graphical control element of the graphical control elements in which the graphical control element is for a component of the respective components. The control unit may also be configured to adjust a mode or setting of the component in response to the touch gesture. The mode or setting may be selectable from a plurality of modes or settings of the component based on a direction in which the graphical control element is dragged. For at least two of the graphical control elements for at least two components of the respective components, the same direction may be used for selection of different modes or settings of the at least two components.

Figure 2A:
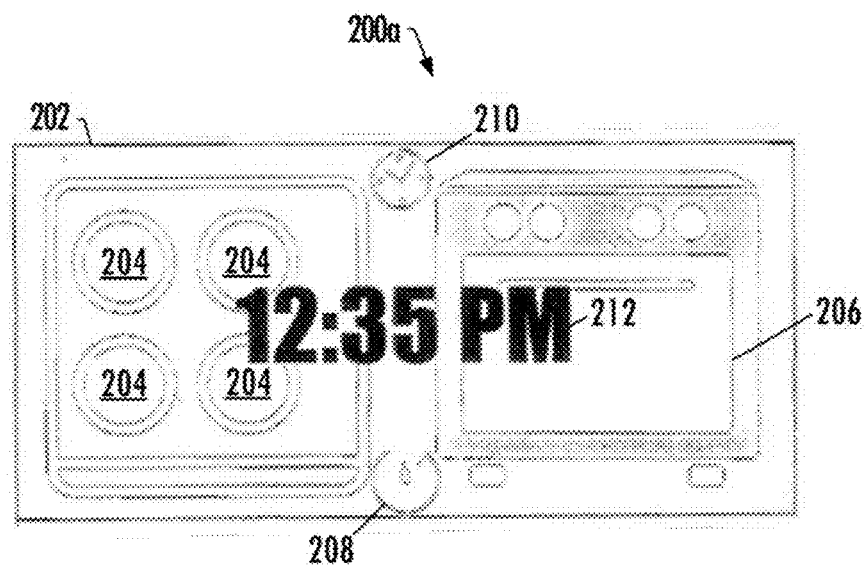
FIGS. 2A, 2B, 3A-3E, 4A-4F, 5A-5F and 6A-6C illustrate a graphical user interface (GUI) according to various example implementations.

As indicated above, the touchscreen 106 may be configured to detect a touch gesture to drag a graphical control element of the graphical control elements in which the graphical control element is for a component of the respective components 102 (e.g., graphical control element 204 for a cooktop burner of at least FIG. 2A). In some example implementations, the touch gesture may initially include a selection of the graphical control element. In one example implementation, in response to the selection of the graphical control element, the control unit 104 may be configured to remove one or more other graphical control elements from the GUI 108, or alter a color or size of the graphical control element in the GUI to confirm the selection. After confirmation of an adjusted mode or setting of the component, the removed graphical control elements may be displayed again on the GUI.

In another example implementation, in which the touch gesture initially includes a selection of the graphical control element, the control unit 104 may be configured to activate the respective component in response to the selection of the graphical control element. For example, in response to the selection of a graphical control element corresponding to a component such as a cooktop burner or a cooking chamber, the control unit may activate the respective cooktop burner or the cooking chamber. In these example implementations, the control unit may also be configured to deactivate the respective component and/or adjust a mode or setting of the respective component in response to the touch screen 106 further detecting a specific actuation of the graphical control element. For example, a single click on a graphical control element, for a currently active component, may effect deactivation of the component. In another example, a double click on a graphical control element for a currently active component may effect adjusting the respective component to a maximum or minimum setting (e.g., maximum temperature setting of a cooking chamber).

In some example implementations, in response to the selection of the graphical control element, the control unit 104 may be configured to add to the GUI 108, a plurality of additional graphical control elements for a respective plurality of functions of the component. In these example implementations, the touchscreen 106 may be configured to detect another touch gesture to select an additional graphical control element of the plurality of additional graphical control elements, and thereby select a function of the respective plurality of functions. In response to the selection, the control unit may be configured to include in the GUI, only the additional graphical control element for the function so selected.

In some example implementations, in response to the selection of the graphical control element, the control unit 104 may be configured to add to the GUI 108, a rotary style menu including a plurality of functions or modes of the component, in which the touchscreen 106 may further detect an additional touch gesture to change a currently-presented menu item based at least in part on a direction in which the items of rotary style menu are dragged.

In response to the touchscreen 106 detecting the touch gesture to drag the graphical control element for a component of the respective components 102, the control unit 104 may be configured to adjust a mode or setting of the component. In some example implementations, the control unit being configured to adjust the mode or setting includes being configured to selectively increase or decrease a power level of the component when the graphical control element is dragged in respectively a first direction or an opposing, second direction. For example, dragging a graphical control element, for a cooktop burner, to the right may selectively increase the power level of the cooktop burner, and dragging the graphical control element back to the left may decrease the power level of the cooktop burner.

In some example implementations, the control unit 104 being configured to adjust the mode or setting further includes the control unit being configured to include in the GUI 108, indicia that corresponds to an adjustment of the mode or setting. In one example implementation, a previous mode or setting and a current more or setting of the component may both be visually distinguished on the GUI.

In some example implementations, the component of the respective components 102 is a timer, and the control unit 104 being configured to adjust the mode or setting includes adding a readout of the timer to the GUI 108. The readout may be partially transparent and superimposed over one or more of the graphical control elements. In some example implementations, the timer may be associated with modes or settings of other components such as by providing functionality to set cook times, and delay and/or start times for respective cooking components.

As indicated above, the appliance 100 may also include a proximity sensor 110. In some example implementations, the proximity sensor may be configured to detect a presence of a nearby user. In response to the detection, the control unit 104 may be configured to activate the touchscreen 106 to display the GUI 108. For example, when the appliance is not in use, the touchscreen may be turned off and/or may display a date, time, or other general information via the GUI. When a user approaches the appliance (e.g., within 6"-12" of the touchscreen), the touchscreen may automatically activate (e.g., actuation by way of the proximity sensor) and display the graphical control elements. In a more particular example, when a user approaches the range of a cooktop oven, the touchscreen may activate and provide graphical control elements that correspond to the cooktop burners, cooking chamber, timer, clock and the like. Examples of suitable proximity sensors may be or include sensors having proximity detection systems, digital ambient light sensing, digital interface logic, and the like.

FIGS. 2A, 2B, 3A-3E, 4A-4F, 5A-5F and 6A-6C illustrate example implementations of GUIs 200a, 200b for a cooktop oven 202 which may respectively be examples of a suitable GUI 108 for a suitable appliance 100. In some example implementations, the GUI may include a schematic diagram that represents components 102 of the appliance with graphical control elements. For example, the graphical control elements 204, 206, 208, 210 of the cooktop oven may represent respectively cooktop burners, a cooking chamber, a timer, and a clock. In some examples, the schematic diagram may be of the appliance in which at least some of the graphical control elements have the same spatial arrangement as the respective components that they represent, such as in the case of cooktop burners in the illustrated examples.

Figure 2B:
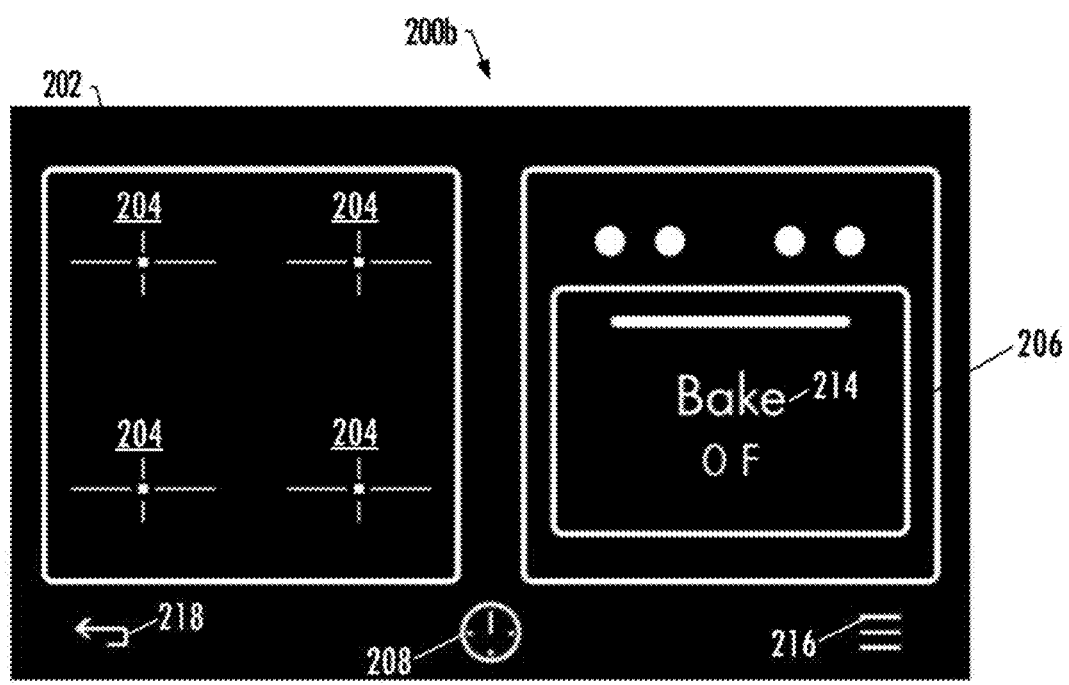

In some examples, as shown in FIG. 2A, the GUI (e.g., GUI 200a) may further include a clock readout 212 (e.g., the current time) superimposed over the graphical control elements. Additionally or alternatively, as illustrated in FIG. 2B, the GUI (e.g., GUI 200b) may include a mode or setting readout 214 of a component (e.g., the cooking chamber) superimposed over the graphical control elements. The GUI may also include a menu icon 216 for selecting additional menu modes or settings, and a return icon 218 for returning to a previously displayed screen, as shown in the GUI of FIG. 2B.

Figure 3A:
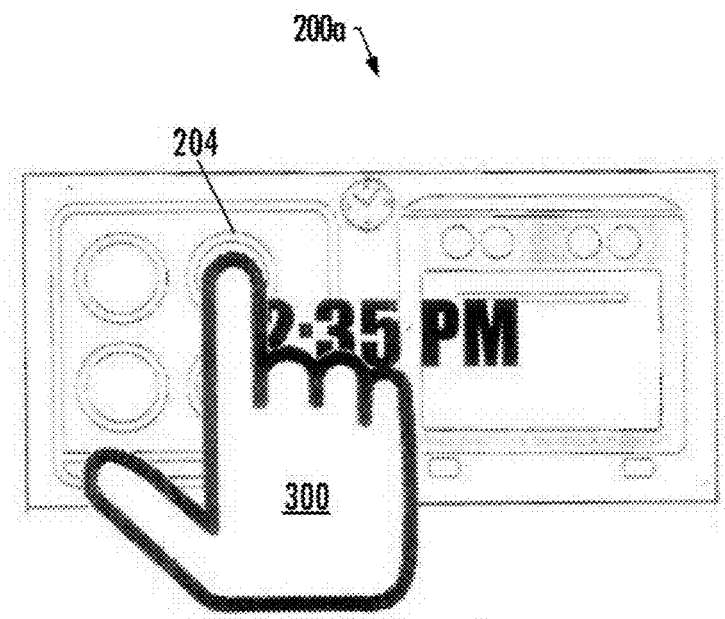
Figure 3B:
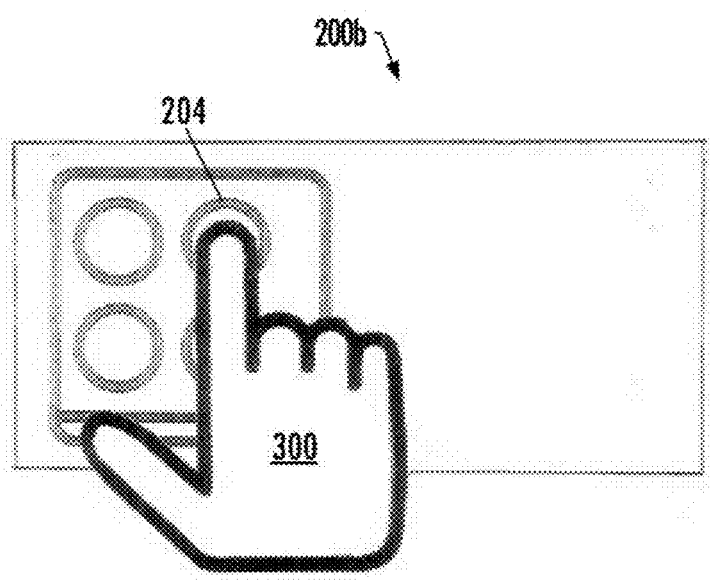

Reference is now made to FIGS. 3A-3E, which illustrate a more particular example of the exemplary GUIs 200a, 200b for a cooktop oven 202 in which the component of the respective components 102 is a respective cooktop burner of the cooktop oven. The touchscreen 106 may initially detect a touch gesture 300 to select a graphical control element 204 for a respective cooktop burner, as shown in FIG. 3A. In response to the selection of the graphical control element, the control unit may 104 remove the other graphical control elements that correspond respectively to the cooking chamber, timer, and clock thereby confirming the selection, as shown in FIG. 3B.

Figure 3C:
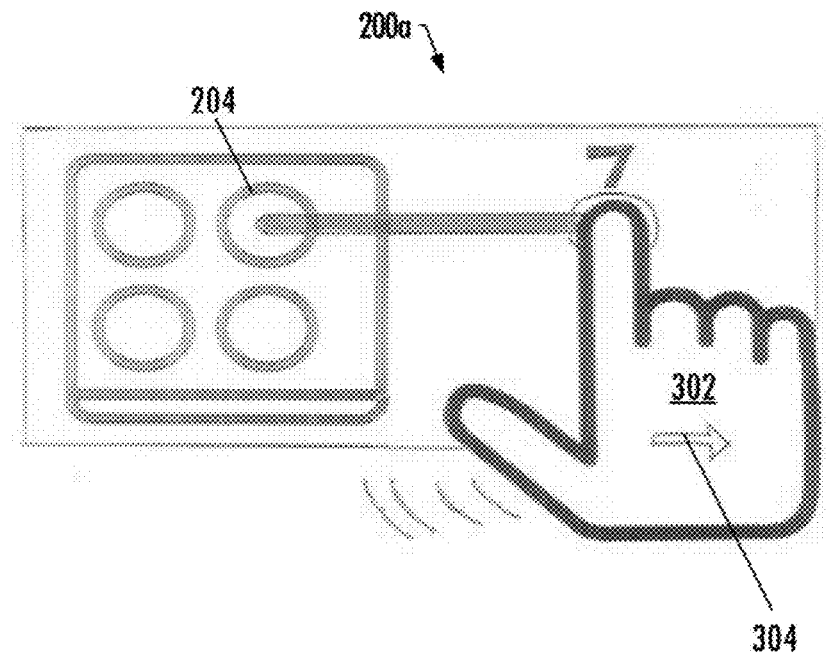
Figure 3D:
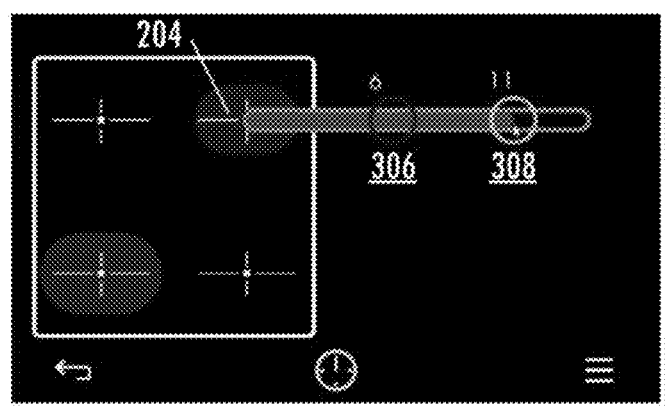
Figure 3E:
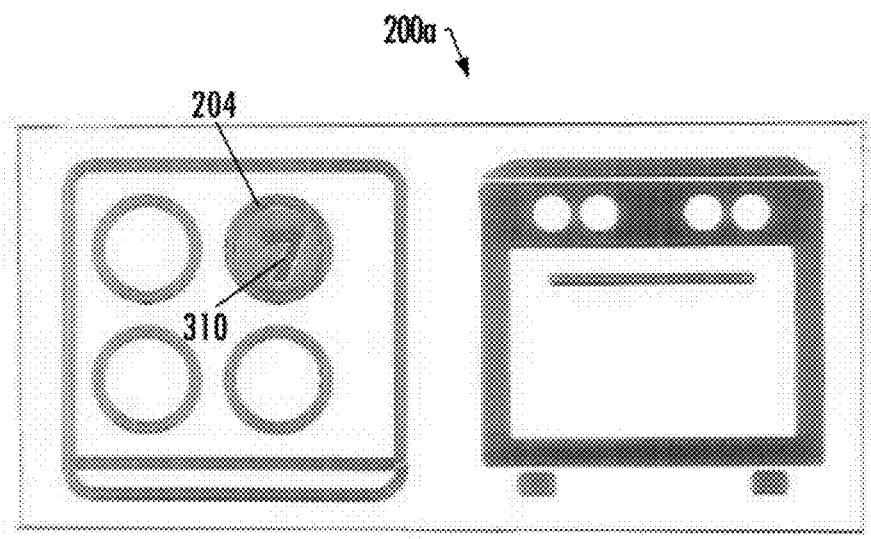

As shown in FIG. 3C, the touchscreen 106 may further detect another touch gesture 302 to drag the selected graphical control element 204 for the respective cooktop burner. In response to detecting the graphical control element 204 being dragged in a first direction 304, the control unit 104 may adjust the setting of the respective cooktop burner by increasing the power level of the cooktop burner. In some example implementations, a previous power level 306 and a current power level 308 may be visually distinguished within the GUI 200b, as shown in FIG. 3D. The control unit may also alter the color of the graphical control element and include indicia 310 with respect to the graphical control element that corresponds to the increased power level of the cooktop burner, and thereby confirms the adjusted setting, as shown in FIG. 3E.

Figure 4A:
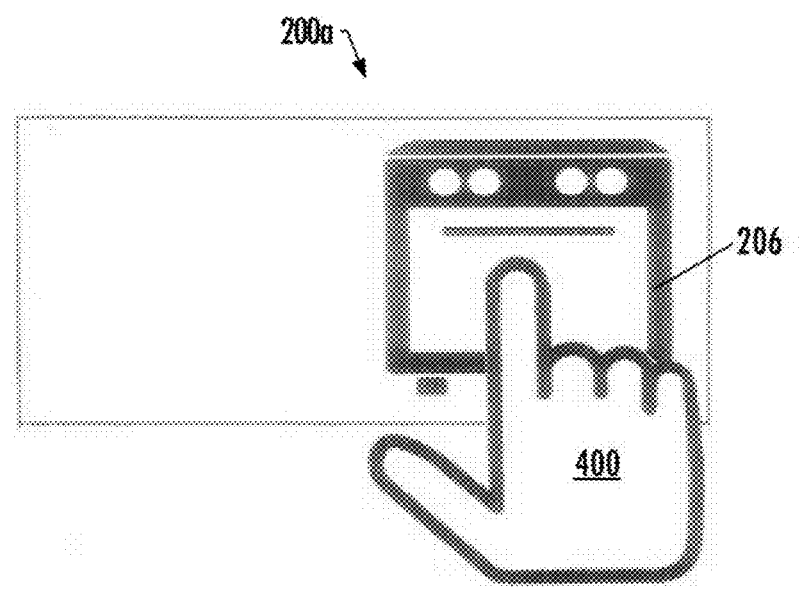
Figure 4B:
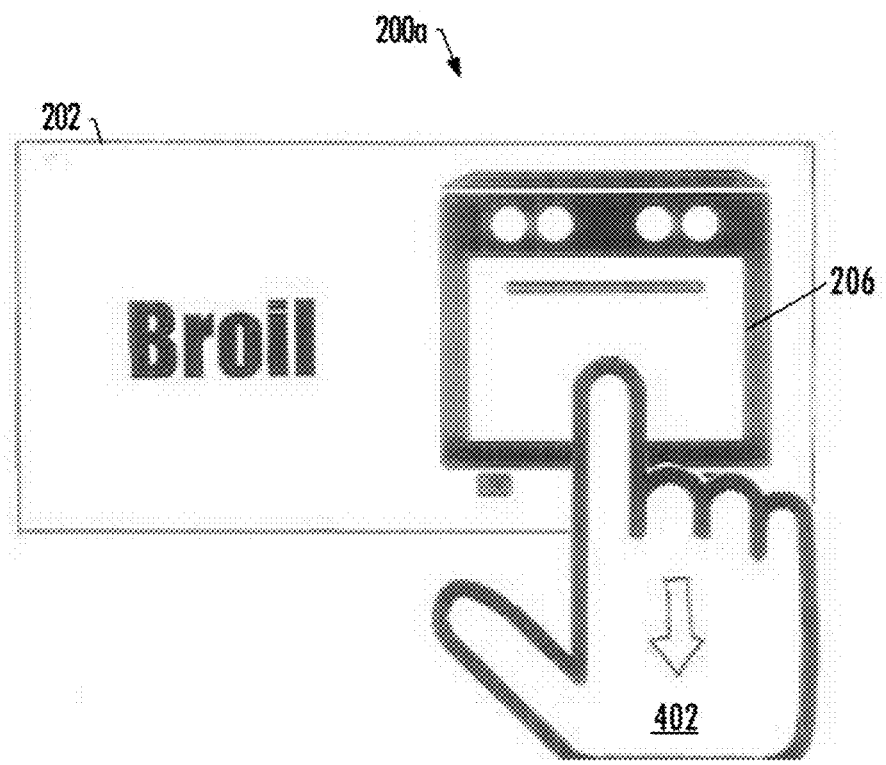
Figure 4C:
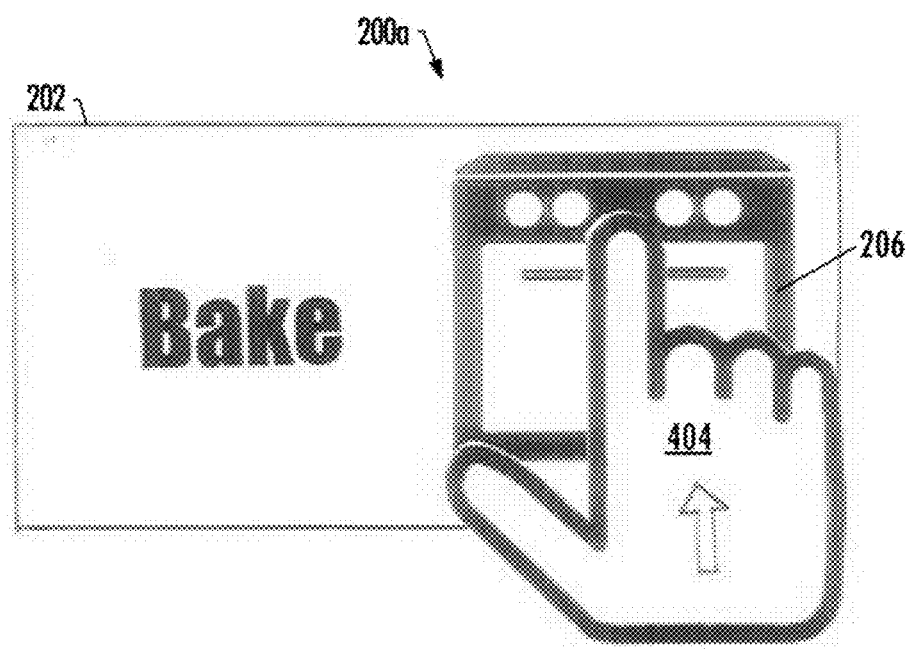
Figure 4D:
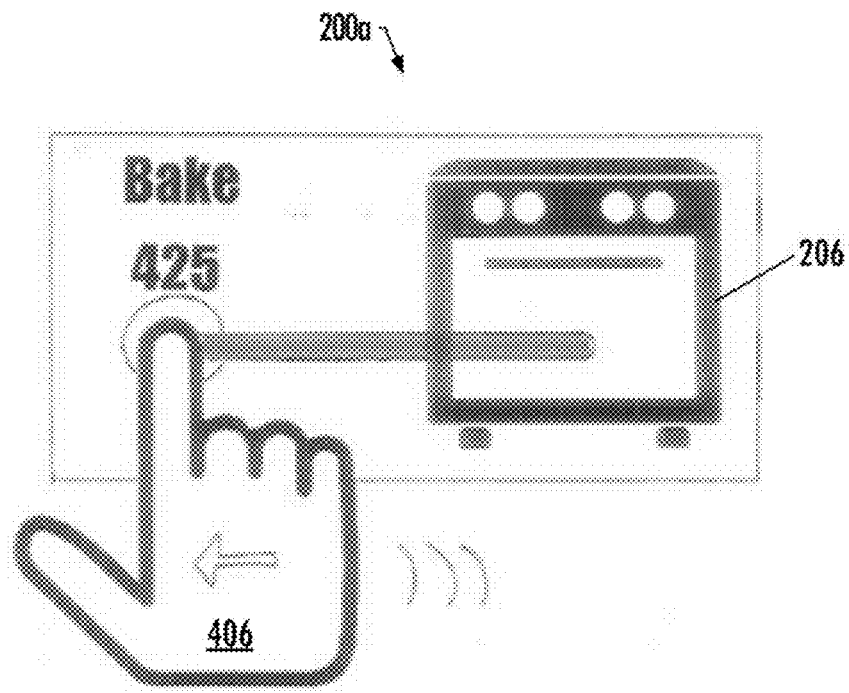
Figure 4E:
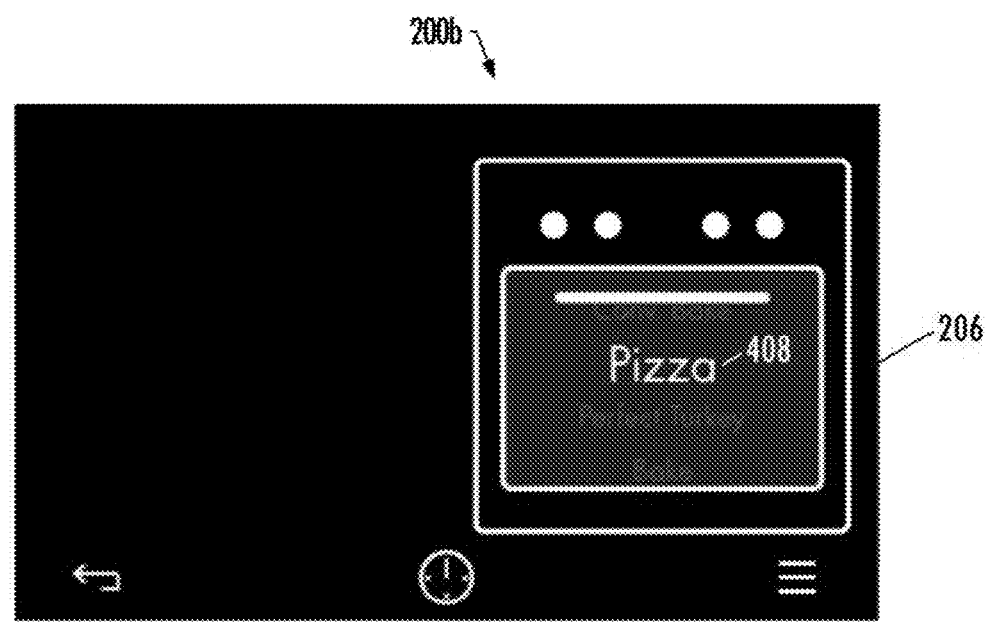

FIGS. 4A-4F illustrate another more particular example of which illustrate a more particular example of the exemplary GUIs 200a, 200b for a cooktop oven 202 in which the component of the respective components 102 is a cooking chamber of the cooktop oven. In response to detecting a touch gesture 400 to select the graphical control element 206 corresponding to the cooking chamber, the control unit 104 may remove the other graphical control elements corresponding respectively to the cooktop burners, timer, and clock to confirm the selection, as shown in FIG. 4A. A mode of setting of the cooking chamber may then be selectable based on a direction in which the graphical control element is dragged. For example, as shown in FIGS. 4B and 4C, in response to dragging the graphical control element in a first direction 402 a broil setting of the cooking chamber may be selectable, and in response to dragging the graphical control element in a second direction 404 a bake setting of the cooking chamber may be selectable. A function of the bake setting (e.g., a baking temperature of the cooking chamber) may be further selectable in response to detecting the graphical control icon is further dragged in an alternatively oriented direction 406, as shown in FIG. 4D.

Figure 4F:
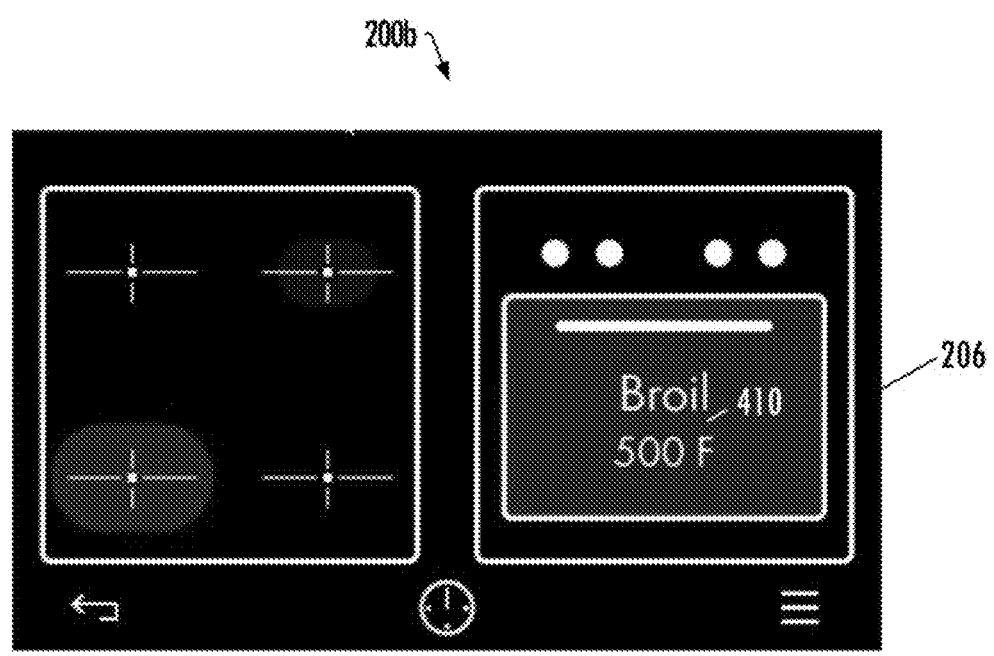

In an alternative implementation, as illustrated in FIG. 4F, in response to detecting the touch gesture 400 to select the graphical control element 206 corresponding to the cooking chamber, the control unit 104 may include in the GUI 200b, a rotary style menu 408 comprising a plurality of modes or settings of the cooking chamber. An additional touch gesture may be detected to change the currently presented menu item (e.g., Pizza mode), or more particularly, select another mode or setting within the rotary style menu (e.g., conventional baking, perfect turkey, bake, and the like). In response to adjusting a mode of setting of the cooking chamber, the control unit may include in the GUI with respect to the graphical control element 206, indicia 410 that corresponds to an adjusting of a mode of setting of the cooking chamber such as a broil temperature of the cooking chamber, and thereby confirms the adjusted mode or setting, as shown in FIG. 4F.

Figure 5A:
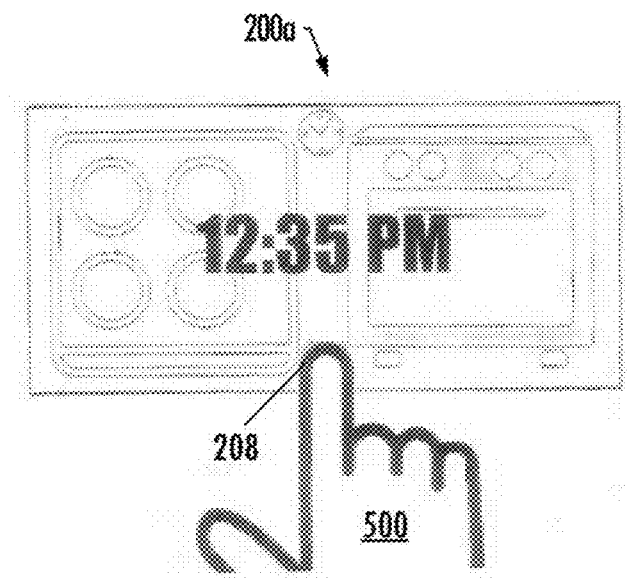
Figure 5B:
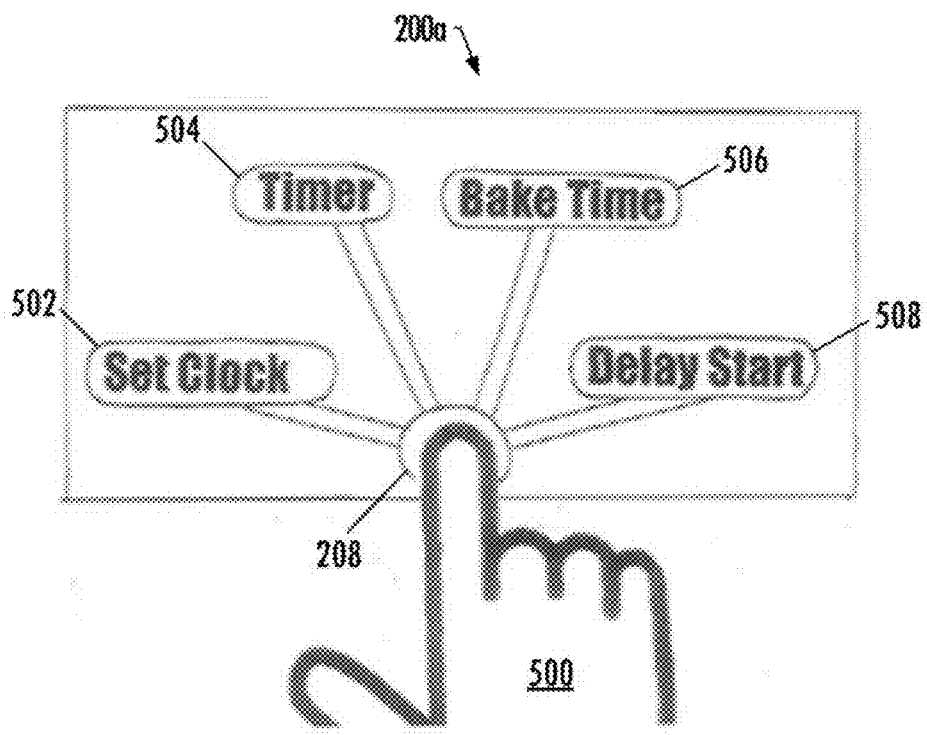

FIGS. 5A and 5B illustrate yet another more particular example of the exemplary GUIs 200a, 200b for a cooktop oven 202 in which the component of the respective components 102 is a timer of the cooktop oven. As illustrated in FIG. 5A, the touchscreen may detect a touch gesture 500 including a selection of the graphical control element 208 for a timer of the cooktop oven. In response to the selection, the control unit 104 may add to the GUI, a plurality of additional graphical control elements 502, 504, 506, 508 for a plurality of functions of the timer including a set clock function, timer function, bake time function, and delayed start function, respectively, as shown in FIG. 5B.

Figure 5C:
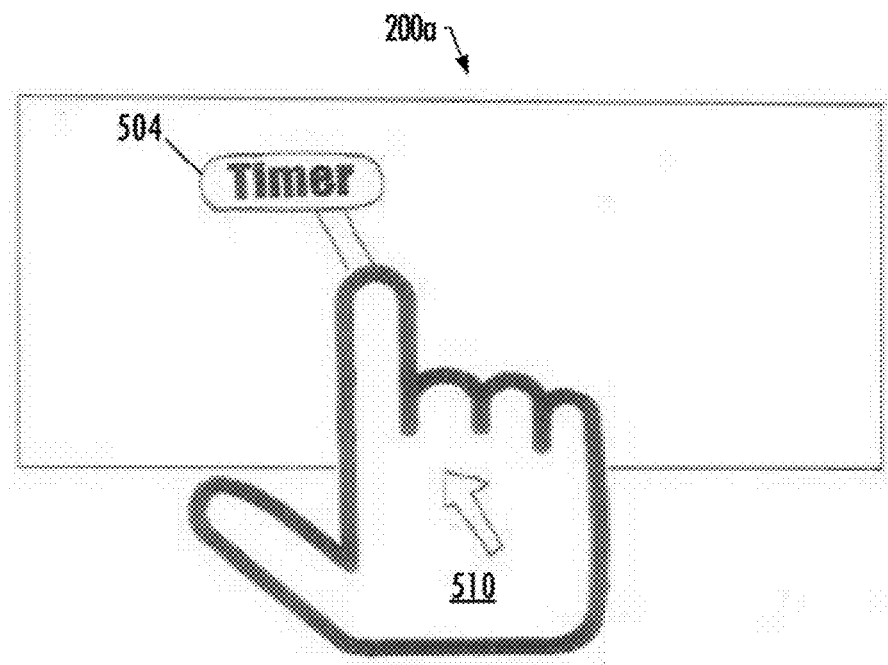
Figure 5D:
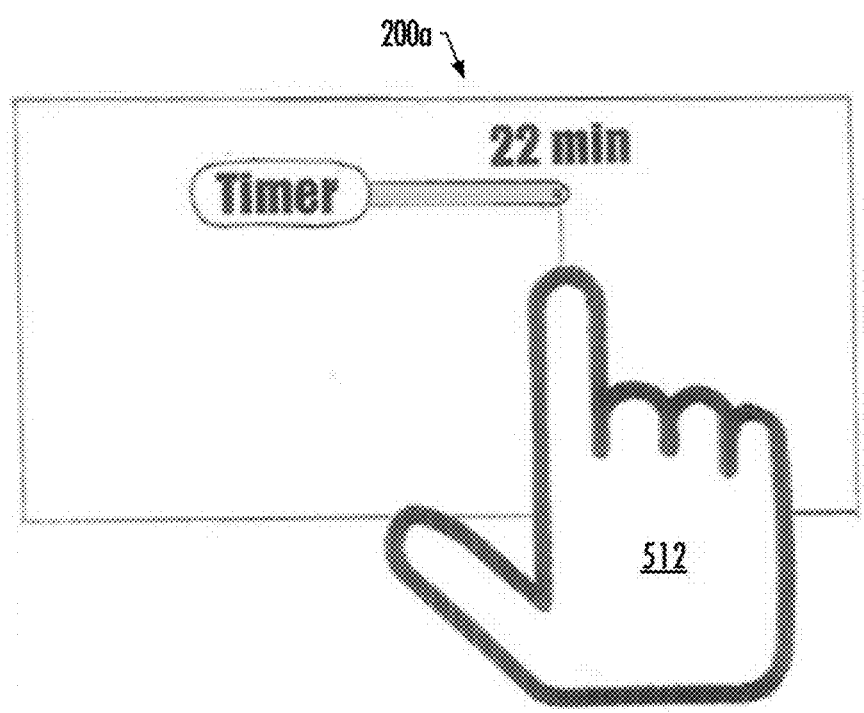
Figure 5E:
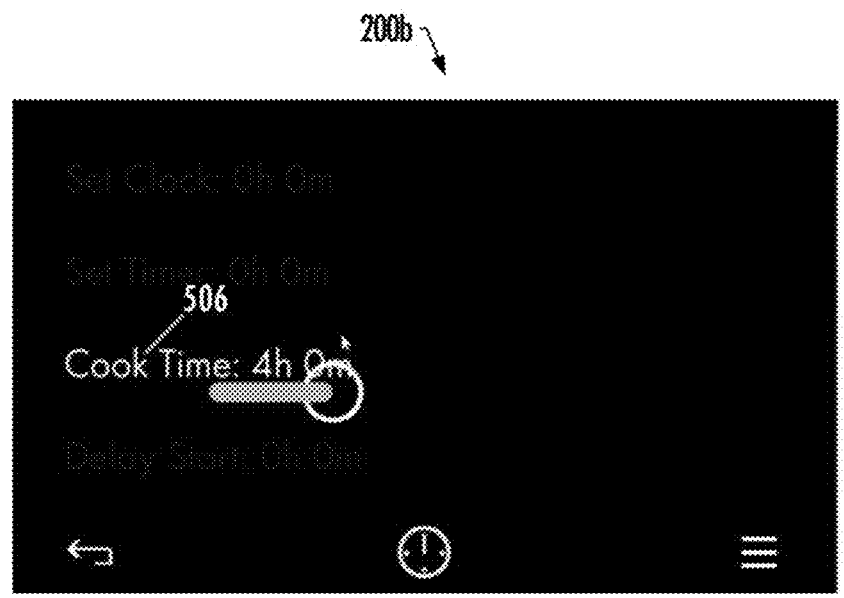
Figure 5F:
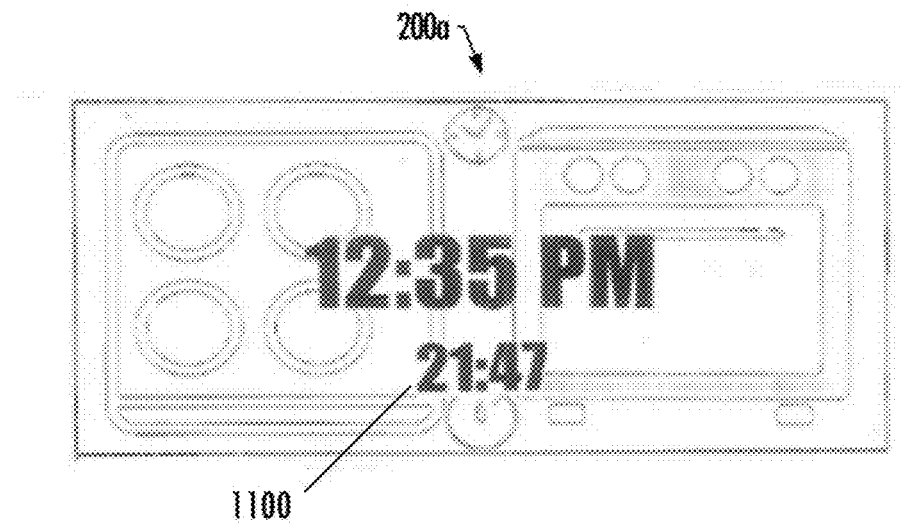

As illustrated in FIG. 5C, the touchscreen 106 may also detect an additional touch gesture 510 to select an additional graphical control element 504 for the timer function of the timer, and in response to the selection the control unit 104 may include in the GUI 200a on the additional graphical control element 504 for the selected timer function. The touchscreen may detect another gesture 512 to drag the additional graphical control element, as shown in FIG. 5D. The function of the timer (e.g., the timer function) may then be selectable, and thereby adjusted by the control unit, based on the direction in which the additional graphical control element is dragged. As shown in FIG. 5E, a cook time function of the timer may be similarly adjusted by dragging the additional graphical control element 506 for the bake time function in the same direction.

As previously indicated, for at least two of the graphical control elements for at least two components of the respective components, the same direction may be used for selection of different modes or settings of the at least two of the components. For example, with respect to FIGS. 3C and 5D, in response to dragging graphical control elements 204, 504, corresponding respectively to a cooktop burner of the cooktop oven 202 and a timer function of the timer component, in the same direction a power level setting may be selectable for the cooktop burner and a timer setting may be selectable for the time function.

Figure 6A:
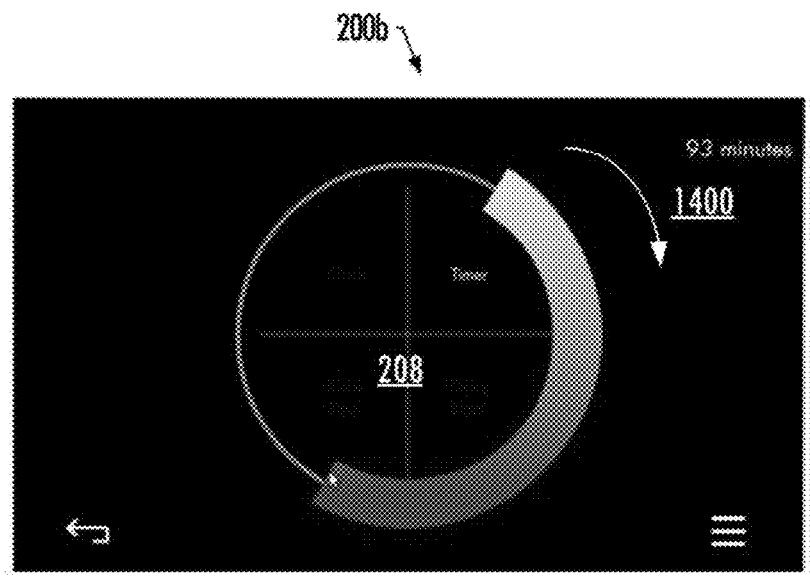
Figure 6B:
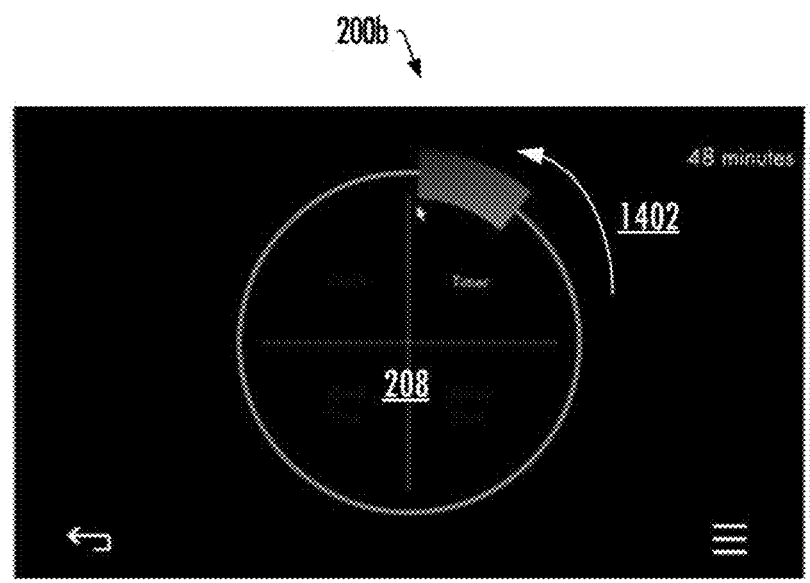
Figure 6C:
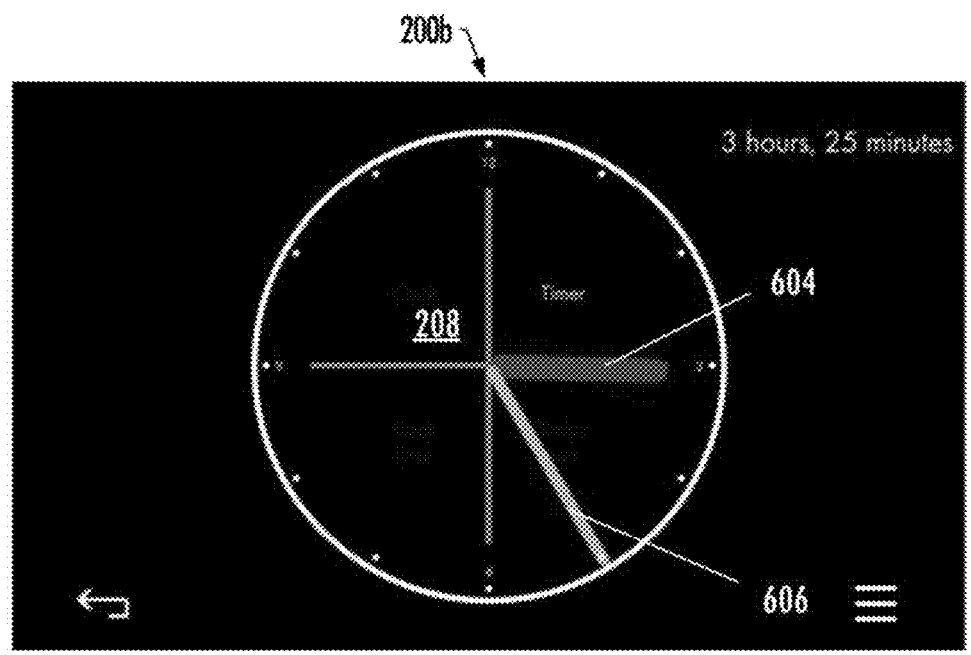

It should be noted that although example implementations of FIGS. 5E and 5D illustrate functions of the timer being selectable based on a horizontal direction in which an additional graphical control element (e.g., additional graphical control elements 504, 506) is dragged, functions of the timer may be selectable based on a graphical control element being dragged in other directions, as shown in FIGS. 6A-6C. For example, in response to detecting a touch gesture to drag the graphical control element 208 for the timer in a clockwise direction 600, and a circular motion, the timer function of the timer may be increased, as shown in FIG. 6A. Similarly, in response to detecting a touch gesture to drag the graphical control element for the timer in a counter-clockwise direction 602, and a circular motion, the timer function of the timer may be decreased.

As illustrated in FIG. 6C, in an alternative example implementation, a function of the timer may be selectable based on an area within the graphical control element 208 at which the touch gesture was detected. For example, an hours setting 604 of the timer function may be selectable by detecting a touch gesture (e.g., circular dragging motion) proximate to the center of the graphical control element, and a minutes setting 606 of the timer function may be selectable by detecting a touch gesture proximate to the perimeter of the graphical control element.

Figure 7:
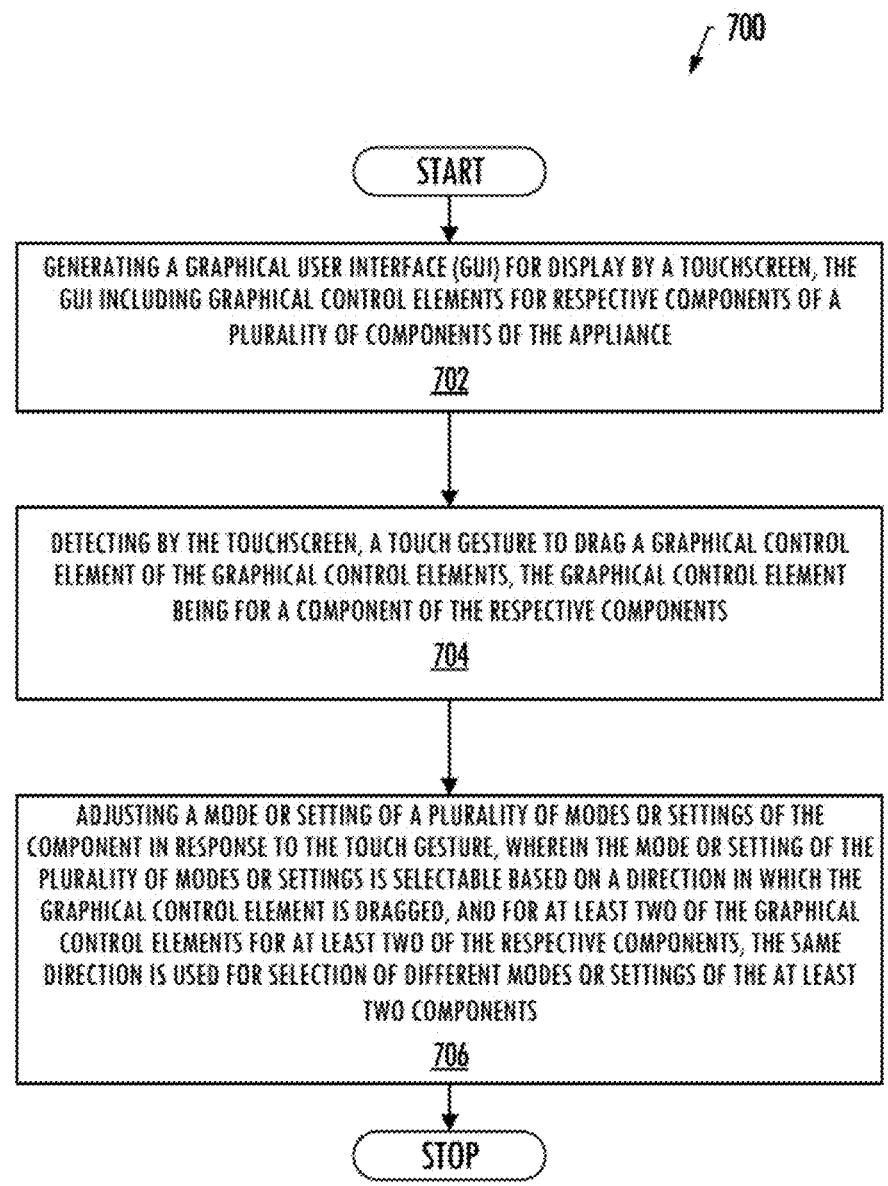
FIG. 7 is a flow diagram illustrating various operations in a method of controlling an appliance, in accordance with an example implementation.

FIG. 7 is a flowchart illustrating various steps in a method 700 of controlling an appliance, according to some example implementations of the present disclosure. As shown at block 702, the method may include generating a graphical user interface (GUI) for display by a touchscreen, the GUI including graphical control elements for respective components of a plurality of components of the appliance. The method may also include detecting by the touchscreen, a touch gesture to drag a graphical control element of the graphical control elements, the graphical control element being for a component of the respective components, as shown at block 704. As shown at block 706, the method may include adjusting a mode or setting of a plurality of modes or settings of the component in response to the touch gesture. The mode or setting of the plurality of modes or settings is selectable based on a direction in which the graphical control element is dragged, and for at least two of the graphical control elements for at least two components of the respective components, the same direction is used for selection of different modes or settings of the at least two components.

As indicated above, program code instructions may be stored in the memory of the appliance 104, and executed by a processor, to implement functions of the systems, subsystems and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. In this manner, the appliance 100 may include a processor and a computer-readable storage medium or memory coupled to the processor, where the processor is configured to execute computer-readable program code stored in the memory. It will also be understood that one or more functions, and combinations of functions, may be implemented by special purpose hardware-based computer systems and/or processors which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated drawings. Therefore, it is to be understood that the disclosure is not to be limited to the specific implementations disclosed and that modifications and other implementations are intended to be included within the scope of the appended claims. Moreover, although the foregoing description and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An appliance comprising:
   a control unit;
   a plurality of components configured to operate under control of the control unit; and
   a touchscreen configured to operate under control of the control unit, the control unit being configured to generate a graphical user interface (GUI) for display by the touchscreen, the GUI including graphical control elements for respective components of the plurality of components,
   wherein the touchscreen is configured to detect a touch gesture to drag a graphical control element of the graphical control elements, the graphical control element being for a component of the respective components,
   wherein the control unit is configured to adjust a mode or setting of the component in response to the touch gesture, and
   wherein the mode or setting is selectable from a plurality of modes or settings of the component based on a direction in which the graphical control element is dragged, and for at least two of the graphical control elements for at least two components of the respective components, the same direction is used for selection of different modes or settings of the at least two components.

2. The appliance of claim 1, wherein the touch gesture initially includes a selection of the graphical control element, and in response, the control unit is configured to remove one or more other graphical control elements from the GUI, or alter a color or size of the graphical control element in the GUI, to confirm the selection.

3. The appliance of claim 1, wherein the touch gesture initially includes a selection of the graphical control element, and in response, the control unit is configured to activate the component.

4. The appliance of claim 1, wherein the touch gesture initially includes a selection of the graphical control element, and in response, the control unit is configured to add to the GUI, a plurality of additional graphical control elements for a respective plurality of functions of the component.

5. The appliance of claim 4, wherein the touchscreen being configured to detect the touch gesture includes being configured to detect another touch gesture to select an additional graphical control element of the plurality of additional graphical control elements and thereby select a function of the respective plurality of functions, and in response, the control unit is configured to include in the GUI, only the additional graphical control element for the function so selected.

6. The appliance of claim 1, wherein the control unit being configured to adjust the mode or setting further includes the control unit being configured to include in the GUI, indicia that corresponds to adjustment of the mode or setting.

7. The appliance of claim 1, wherein the component is a timer, and the control unit being configured to adjust the mode or setting includes control unit being configured to add a readout of the timer to the GUI, the readout being partially transparent and superimposed over one or more of the graphical control elements.

8. The appliance of claim 1, wherein the control unit being configured to adjust the mode or setting includes being configured to selectively increase or decrease a power level of the component when the graphical control element is dragged in respectively a first direction or an opposing, second direction.

9. The appliance of claim 1 further comprising a proximity sensor configured to detect a presence of a nearby user, and in response, the control unit is configured to activate the touchscreen to display the GUI.

10. A method for controlling an appliance, the method comprising at the appliance:
    generating a graphical user interface (GUI) for display by a touchscreen, the GUI including graphical control elements for respective components of a plurality of components of the appliance;
    detecting by the touchscreen, a touch gesture to drag a graphical control element of the graphical control elements, the graphical control element being for a component of the respective components; and
    adjusting a mode or setting of the component in response to the touch gesture,
    wherein the mode or setting is selectable from a of a plurality of modes or settings of the component based on a direction in which the graphical control element is dragged, and for at least two of the graphical control elements for at least two components of the respective components, the same direction is used for selection of different modes or settings of the at least two components.

11. The method of claim 10, wherein the touch gesture initially includes a selection of the graphical control element, and the method further comprises in response thereto, removing one or more other graphical control elements from the GUI, or altering a color or size of the graphical control element in the GUI, to confirm the selection.

12. The method of claim 10, wherein the touch gesture initially includes a selection of the graphical control element, and the method further comprises in response thereto, activating the component.

13. The method of claim 10, wherein the touch gesture initially includes a selection of the graphical control element, and the method further comprises in response thereto, adding to the GUI, a plurality of additional graphical control elements for a respective plurality of functions of the component.

14. The method of claim 13, wherein detecting the touch gesture includes detecting another touch gesture to select an additional graphical control element of the plurality of additional graphical control elements and thereby select a function of the respective plurality of functions, and the method further comprises in response thereto, including in the GUI, only the function so selected.

15. The method of claim 10, wherein adjusting the mode or setting further includes including in the GUI, indicia that corresponds to adjustment of the mode or setting.

16. The method of claim 10, wherein the component is a timer, and adjusting the mode or setting includes adding a readout of the timer to the GUI, the readout being partially transparent and superimposed over one or more of the graphical control elements.

17. The method of claim 10, wherein adjusting the mode or setting includes being configured to selectively increase or decrease a power level of the component when the graphical control element is dragged in respectively a first direction or an opposing, second direction.

18. The method of claim 10 further comprising detecting by a proximity sensor, a presence of a nearby user, and in response, activating the display to present the GUI.

* * * * *